United States Patent [19]

Kopyleva et al.

[11] Patent Number: 5,824,132
[45] Date of Patent: Oct. 20, 1998

[54] METHOD OF PHOSPHORIC ACID CONCENTRATION

[76] Inventors: Bronislava Kopyleva; Yuriy Shvartsman, both of 120-07 85th Ave., Kew Gardens, N.Y. 11415

[21] Appl. No.: 799,975

[22] Filed: Feb. 12, 1997

[51] Int. Cl.⁶ .................................. B01D 1/00; B01D 1/26
[52] U.S. Cl. ................................. 71/43; 71/94; 159/47.1; 159/DIG. 20; 423/321.1
[58] Field of Search ................................. 423/317, 321.1; 203/63, 64, 12; 71/32–34, 43; 159/47.1, 47.2, DIG. 8, DIG. 20

[56] References Cited

U.S. PATENT DOCUMENTS 3,314,756  4/1967  Myon .
3,457,036  7/1969  Backlund .
4,551,319  11/1985  Sanchez et al. ..................... 423/321.1

FOREIGN PATENT DOCUMENTS 833490  6/1981  U.S.S.R. ............................. 423/321.1

OTHER PUBLICATIONS

Sikdar et al, AIChE Journal, vol. 23, No. 3, "Effect of a Surface Active Agent on the Viscosity of Suspensions" May 1977.

*Primary Examiner*—Wayne Langel
*Attorney, Agent, or Firm*—Kane, Dalsimer, Sullivan, Kurucz, Levy, Eisele and Richard

[57] ABSTRACT

The wet process phosphoric acid evaporation, its clarifying, fertilizer production and fertilizer efficiency is improved in the presence of multi-component mixture of anionic surfactants and ammonium compound.

15 Claims, No Drawings

METHOD OF PHOSPHORIC ACID CONCENTRATION

BACKGROUND OF THE INVENTION

1. Field of the Invention

The invention relates to an improved industrial process for concentrating and clarifying wet-process phosphoric acid and fertilizer production. The improved process enhances removal of solids and fluorine compounds, decreasing energy consumption, increasing acid evaporator productivity and efficiency of fertilizer manufacture. The quality of fertilizer for increased protein and crop yield is enhanced.

2. Brief Description of Related Art

The oldest economical process for making phosphoric acid is to treat phosphate rocks with sulfuric acid or with mixtures of sulfuric and phosphoric acid, precipitating calcium sulfate and releasing phosphoric acid. The last is called wet-process phosphoric acid. Generally it is desirable to concentrate this wet-process phosphoric acid and purify it. Purification may comprise the removal of coloring materials such as iron and vanadium after one or more stages of concentration. The wet-process phosphoric acid production is described fully in the Kirk Othmer Encyclopedia of Chemical Technology, (Second Edition) volume 9, p. 87.

In general, the wet-process phosphoric acid is concentrated and purified by evaporation of water and separation of solid precipitates. The concentrating process has some effect in removal of fluorine, most of the calcium, some iron, aluminum and sulfate. However, the conventional purification leaves considerable organic matter and contamination.

Wet-process phosphoric acid is an intermediate product for fertilizer production as well as other phosphate products. Fertilizer production may include concentration of a filtered dihydrate phosphoric acid (24–28%, $P_2O_5$) or semi-hydrate phosphoric acid (35–38% $P_2O_5$) to a desired level by any of a number of conventional evaporative techniques. The filtered acid is concentrated to different commercial grades or acid strengths ranging from 40–42% to 72–76% acid ($P_2O_5$% basis) during such evaporation process. However, filtered acid contains a wide variety of chemical impurities (metallic and organic) originating from the phosphate rock that is solubilized and dispersed within the acid liquor. Presence of impurities leads to scale formation on heated surfaces due to changing of the impurity's solubility. Scale reduces a flow rate through the evaporator, heat transfer and as a result evaporation productivity decreases. Therefore, an operating cycle is typically 6–14 days and a cleaning cycle is typically 1.5–2.5 days. The process of phosphoric acid concentration is fairly energy consuming; the consumption of steam is as high as 3.5 ton per 1 ton of $P_2O_5$.

The existing means of a concentration process are connected with a growth of productivity by increasing the reliability of evaporators and modifying the concentration process itself (see for example, U.S. Pat. No. 3,607,319). In particular, under the effect of pressure (see for example, U.S. Pat. No. 4,551,319), and developing methods of reducing deposits (see for example U.S. Pat. Nos. 5,173,280 and 5,318,707). However, the concentrated phosphoric acid contains a significant amount of impurities (0.6–0.8% fluorine, 1.2–1.4% $R_2O_3$). Combining an acid concentrating procedure with deep defluorination (see for example, U.S. Pat. No. 5,002,744; U.S. Pat. No. 3,607,391) leads to even greater energy cost: steam consumption is about 3.5–4 ton per 1 ton $P_2O_5$ (see Japanese Pat. No. 55/90408; U.S. Pat. No. 4,435,372). It is also known to treat of an acid with a steam or a steam-gas mixture and by addition of diatomaceous earth (see U.S. Patent No. 5,312,610). As a result, fluorine content in a concentrated acid (about 70% $P_2O_5$) decreases to 0.10–0.15%.

Flocculants are often applied for acid clarification; see for example U.S. Pat. No. 3,644,091 which discloses the use of water soluble sulfonated polystyrenes having a molecular weight of from about 1 to about 40 million. U.S. Pat. No. 4,291,005 discloses the use of acrylamide/acrylate polymers for settling suspended solids in phosphoric acid product solutions. Japanese patent No. 56/88814 discloses the use of acrylamide/meth-acryloyloxy ethyldimethylbenzyl-ammonium chloride copolymers to flocculate solids from phosphoric acid.

Organic polymers aid to improve separation of suspended solids from phosphoric acid of any grade, but residual organic substances can increase acid viscosity and boiling temperature during concentration.

Russian Pat. No. 1255565 discloses that adding of a mixture of fatty acid sodium salts together with resin acids sodium salts and lignin sodium salts decreases energy consumption while evaporating phosphoric acid, however, the presence of lignin provides a nonstable regime of phosphoric acid evaporation from 28% $P_2O_5$ to 51–54% $P_2O_5$.

U.S. Pat. No. 5,482,529 describes the fertilizing preparations in the form of an emulsion-suspension or an emulsion which contains water, an oleophilic organic substance, surface-active agent, and organic or inorganic acid to improve the extraction of phosphorus. It uses as a surface-active agent $C_1$–$C_{10}$ monocarboxylic acid, hydroxycarboxylic acid, hydrolyzed polyacrylamide, soy lecithin, sokalan (mixture of $C_2$–$C_4$ dicarboxylic acids), or ester of a polyol and a fatty acid or derivative thereof or a ligno-sulfonate. It suggests a considerable amount (up to 25%) of surface-active agent in the fertilizing suspension.

By contrast, the present invention relates to use of a specific multi-component surfactant mixture, with a wide spectra of each component quantity to improve concentrating and clarifying all grades of phosphoric acid from less than 25 to more than 70% $P_2O_5$ as well as making fertilizer which increases its efficiency. A stable regime of evaporation on each stage occurs increasing operating cycle between cleaning. Also the produced fertilizer increases crop yield and protein content in crops.

The instant invention is directed to improving a multi-stage process including phosphoric acid concentrating, clarifying acid from solids, and both fertilizer production and fertilizer efficiency. More particular, the invention is directed to improve the production of phosphoric acid concentrating and clarifying processes, and fertilizer to increase phosphate, nitrogen mobility in soil and crop and protein production by changing properties of liquid and solid phases, solutions and pulps in phosphoric acid production and fertilizer production as well as the same properties of soil components. The improvement is characterized by addition of an effective amount of a multi-component mixture of particular and specific anionic surface active agents. The process results in low acid viscosity, changing solubility of the impurities that results in increasing clarifying efficiency and enhanced evaporators and fertilizer production output.

SUMMARY OF THE INVENTION

The invention comprises a process for concentrating phosphoric acid in aqueous mixture, which comprises; evaporation of a phosphoric acid containing aqueous mixture, precipitating solids in the presence of a particular mixture of anionic surfactants. Advantageously, the process is carried out in the presence of ammonia ion.

The term "surfactant" as used herein is a contraction of "surface-active agent" and is a broadly descriptive term used to describe a chemical compound which is (1) soluble in at least one phase of a system, (2) has an aliphatic structure, (3) the molecules of which form oriented monolayers at phase interfaces, (4) exhibits an equilibrium concentration as a solute at a phase interface, greater than its concentration in the bulk of the solution, (5) forms micelles when the concentration as a solute in solution, exceeds a characteristic limiting value and (6) exhibits some combination of the functional properties of detergency, foaming, wetting, emulsifying, solubilizing and dispersing.

Representative of anionic surfactants are surfactant compounds which contain an organic hydrophobic group containing from about 8 to 30 carbon atoms and preferably from about 10 to 22 carbon atoms in their molecular structure; and at least one water-solubilizing group selected from the group consisting of sulfonate, sulfate and carboxylate so as to form a water-soluble surfactant.

Examples of anionic surfactants include soaps, such as, the water-soluble salts (e.g., the sodium, potassium, ammonium and alkanol-ammonium salts) of higher fatty acids containing from about 8 to 30 carbon atoms.

Other anionic surfactants are the alkane sulfonates including long chain alkane sulfonates and long chain hydroxyalkane sulfonates. Also the sulfated ethoxylated higher fatty alcohols of the formula RO $(C_2H_4O)_m SO_3M$, wherein R is a fatty alkyl of from 10 to 22 carbon atoms, m is from 2 to 6 (preferably having a value from about ⅕ to ½ the number of carbon atoms in R) and M is a solubilizing salt-forming cation, such as an alkali metal, ammonium, lower alkylamino or lower alkanolamino, or higher alkyl benzene sulfonate wherein the higher alkyls of 10 to 15 carbon atoms are present. The proportion of ethylene oxide in the polyethoxylated higher alkanol sulfate is preferably 2 to 5 moles of ethylene oxide groups per mole of anionic surfactant, with three moles being most preferred, especially when the higher alkanol is of 11 to 15 carbon atoms.

The product of the process of the invention is an intermediate product and may be neutralized to obtain any phosphate-containing fertilizer such as ammonium phosphate fertilizers, triple super-phosphate, liquid fertilizers and others.

DETAILED DESCRIPTION OF THE INVENTION

The conventional process for manufacture of phosphoric acid comprise beneficiation of mineral phosphate rock by washing, screening and filtering to concentrate the phosphate materials. The phosphate material is then digested in hot (80°–140° C.) sulfuric acid (actually a mixture of phosphoric and sulfuric acids). The hot phosphoric acid solution resulting contains about 28 percent or 35–38 percent $P_2O_5$. Filtration removes the insolubles. The aqueous solution of phosphoric acid is then evaporated in multiple stages to purify and concentrate the phosphoric acid to use it in fertilizer production.

The instant invention is directed to a method for improving phosphoric acid concentrating, clarifying and fertilizer production, which method comprises carrying out multi-stage evaporations in the presence of a special mixture of anionic surfactants. The special mixture is added into aqueous phosphoric acid and/or polyphosphoric acid and/or into a fertilizer product in an effective amount to enhance concentration or clarification of the acid product. The product composition comprising a phosphoric acid, or partially neutralized phosphoric acid or fertilizer are also part of the invention.

The preferred surfactant mixture is a multi-component surfactant mixture which is water soluble and has anionic character. This mixture is selected from a combination of straight-chain (aliphatic) and cyclic (cyclo-aliphatic or aromatic) monocarboxylic acids and alcohols. More particularly, the straight-chain and cyclic monocarboxylic acids comprise $C_6$–$C_{24}$ acids and their salts thereof. The alcohols comprise the compounds of 14–30 carbon atoms consisting of straight-chain (aliphatic) alcohols and cyclic (cyclo-aliphatic or aromatic) monohydrate alcohols and their salts thereof.

The preferred multi-component surfactant mixture is a mixture of water soluble anionic surfactants selected from acids and alcohols, containing 6–30 carbon atoms. The term acids and alcohols refers to each acid and each alcohol and their compounds which include their salts in the form of sodium or potassium or ammonium or other salts. More specially, alcohols are cyclo-aliphatic or aromatic monohydrate alcohols with a molecular weight of about 300–450.

Preferably, the multi-component surfactant mixture used in the instant invention consists of straight-chain and cyclic monocarboxylic acids ($C_6$–$C_{24}$), straight-chain alcohols, and cyclic monohydrate alcohols with a molecular weight about 300–450 and containing at least one component of each group mentioned above.

The most preferred multi-component surfactant mixture is believed to be a mixture which comprises (by weight): a) about 10 to about 98% of straight-chain and aromatic or cycloaliphatic monocarboxylic acids; b) about 0.5 to about 17% of straight-chain alcohols; c) about 0.1 to about 37% cyclic monohydrate alcohols with a molecular weight of about 300–450.

Most preferred in the improved process of the invention as the multi-component surfactant mixture for economy and functional advantages, is the mixture obtained as a by-product of the sulfate or Kraft process for digesting wood. This by-product, known as tall oil soap, are the salts of tall oil acids, or the black liquor soap skimmings.

Tall oil soap is a well-known by-product of the sulfate or Kraft process for digesting wood. Crude tall oil soap is made up of salts of varying proportions of fatty acids, resin acids and so-called "neutrals". Crude tall oil obtained in the United States typically comprises from 18 to 53% by weight of fatty acids, 35 to 65% by weight of resin acids and 8 to 24% by weight of neutral compounds. These neutral compounds comprise a wide variety of alcohols, aldehydes, ketones, hydrocarbons, sterols and like compounds.

Advantageously, the process of the present invention is speeded-up considerably when carried out in the additional presence of ammonium ion. The ammonium ion may be provided by dissolving in the aqueous mixture a compound of ammonia.

Preferably, ammonia compound is represented by ammonia and ammonium salt. It may be mixed with the above multi-component surfactant mixture at any stage.

The instant multi-component surfactant mixture with ammonia compound may be prepared specially or use any product containing at least all specified groups.

The instant multi-component surfactant mixture with ammonia compound is added, preferably into the aqueous mixture of phosphoric acid and/or polyphosphoric acid and/or partially neutralized phosphoric acid of any $P_2O_5$ concentration and/or into a final fertilizer as a water solution.

An effective amount of the multi-component surfactant mixture is used. The effective amount refers to that dosage of the multi-component mixture, on an active basis necessary to give the desired level of improving phosphoric acid concentration process, clarification in the acid being used, and fertilizer production as well as the efficiency of fertilizers.

Preferably the effective amount will be sufficient to provide a dosage in the range of from about 0.00001% to about 1.0% depending on $P_2O_5$ concentration, presence or forming of solid phase and the amount of surfactant used on previous stage, preferably 0.00001% to 0.2%

Preferably, the concentration of ammonia compound to provide ammonium ion is from 0.25% to 10% by weight of the effective amount of multi-component surfactant mixture.

The multi-component surfactant mixture and ammonia compound is preferably added to any grade acid solution before or after any stage of evaporation and keeping it up to 42 hours to clarify from solids and after separation acid is delivered to next stage of evaporation.

Said effective amount of said multi-component surfactant mixture is supported in phosphoric acid delivered to fertilizer preduction and/or in partially neutralized phosphoric acid of any $P_2O_5$ concentration and/or into final fertilizer.

The multi-component surfactant mixture is preferably introduced in a phosphoric acid aqueous stream; or polyphosphoric acid stream; or in a partially neutralized phosphoric acid of any $P_2O_5$ concentration; or in a final fertilizer; or any conventional method of adding, including the use of multiple feed points. Any evaporation equipment, clarification device, reactors and granulators can be used.

The inventors have found the multi-component surfactant mixture to be effective in all stages of evaporation, clarification and fertilizer production.

The following examples further demonstrate the instant invention. They are not, however, intended to limit scope of the invention in any way. These examples describe for the instance the process for the improving concentration, clarification and fertilizer production.

PREPARATION 6 g of straight-chain, aliphatic, $C_6$–$C_{22}$ monocarboxylic acids, 1.5 g of cyclic, $C_{20}$ monocarboxylic acids, 0.8g of straight-chain, aliphatic $C_{14}$–$C_{24}$ alcohols, 1.7 g of cyclic monohydrate alcohols with a molecular weight about 300–450 was mixed to get sodium salts. This mixture was dissolved in water and a 10% water solution of the multi-component surfactant mixture was obtained. Finally, 1.8 g 20% solution of ammonium sulfate was added to this mixture.

EXAMPLE I

Acid concentrating, precipitating and fertilizer production tests were conducted. On an acid stream containing 27.5% $P_2O_5$, 0.64% $C_a$-, 2.3% $SO_4$, 2.4% F, 0.48% $M_gO$, 0.9% $Fe_2O_3$ and 1.2% of $Al_2O_3$, and 2.1% solids. To the acid aqueous mixture there was added 50 ml of a 1% water solution of the above Preparation of a surfactant multi-component mixture. After adding acid held about 2–3 hours. The solid content in the clarified acid was about 0.3%. Then the acid was delivered to the evaporator. The result acid contented 52.3% $P_2O_5$, 0.3% F. Rate of evaporation was 30–80% more than obtained when acid without multi-component mixture was evaporated. The amount of multi-component mixture added was an effective amount. Granular product was obtained. The amount of coarse and fine particle decreased by 40%. Dust content in gas after granulation drum was reduced by 37%. Plant growing test was carried out using obtained granular fertilizer. Sod-podsolic soil was portioned into two vessels and granular $KNO_3$ and KCl were added in each vessel for balancing the nutrients. 2 grams of prepared fertilizer was added in one vessel and the same amount of fertilizer without multi-component mixture was added in another vessel as a comparison. The plant grown in both vessels was wheat. The obtained grains were dried and their nitrogen and potassium content were determining.

The results are in Table.

| Fertilizer used | Weight of 1000 grains, g. | Nitrogen content in grains, g | Potassium content grains, % |
|---|---|---|---|
| regular fertilizer | 39.9 | 1.50 | 0.36 |
| with multi-component surfactant mixture | 44.2 | 1.81 | 0.41 |

The crop yield was 11% more and nitrogen content was 21% than when regular fertilizer was used. Nitrogen growth is fundamentally important for increasing protein content in wheat and other crops.

EXAMPLE 2

Acid concentrating, precipitation and fertilizer production tests were conducted, on 27.5% $P_2O_5$ acid, containing 0.64% $C_aO$, 2.3% $SO_4$, 2.4% F, 0.48% $M_gO$, 0.9% $Fe_2O_3$, 1.2% $Al_2O_3$ and 2.1% solids. A blended emulsion of a mixture of anionic surfactants containing about 65% of straight-chain aliphatic and cyclic monocarboxylic acids, about 15% straight-chain aliphatic and cyclic monohydrate alcohols, and mixed it with ammonium sulfate was added (50 ml 1% water solution). After adding the acid was held about 0.2–3) hour. The solid content in clarified acid was about 0.3%. If necessary additional surfactant was added. Then the acid was delivered to an evaporator. The resulting acid contained 51.9% $P_2O_5$, 0.32% F. Rate of evaporation was 30–80% more than obtained when acid without said surfactant mixture was evaporated. The amount of said surfactant mixture added was an effective amount. A granular product was obtained. The amount of coarse and fine particle decreased by 42%. Dust content in gas after granulation drum was reduced by 35%. Plant growing test was carried out using obtained granular fertilizer. Sod-podsolic soil was portioned into two vessels and granular $KNO_3$, and KCl were added in each vessel for balancing the nutrients. Two grams of prepared fertilizer were added in one vessel and the same amount of fertilizer without said mixture was added in another vessel as a comparison. The plant grown in both vessels was wheat. The obtained grains were dried and their nitrogen and potassium content were determined. The results are in Table.

| Fertilizer used | Weight of 1000 grains, g. | Nitrogen content in grains, g | Potassium content grains, % |
|---|---|---|---|
| regular fertilizer | 40.3 | 1.60 | 0.35 |
| with said mixture | 44.9 | 1.89 | 0.40 |

The crop yield was 11% more and nitrogen content was 25% more than when regular fertilizer was used. Nitrogen growth is fundamentally important for increasing protein content in wheat and other crops.

EXAMPLE 3

The test was implemented on an acid solution identical with that in Example 2. Tall oil soap mixture, containing about 81% of straight-chain and cyclic monocarboxylic acids, about 6% of straight-chain alcohols, about 14% cyclic monohydrate alcohols with molecular weight about 300–450 was added as 2% water solution, containing ammonia compound (about 0.02%) to the acid and mixed. Then acid was delivered to evaporation stage and 52% $P_2O_5$ acid was obtained. Content of fluorine was 0.31%, solids 2.4%. For clarifying acid from solids it was blended with additional amount of tall oil soap and was kept about 2–3 hour. The solid content in clarified acid was less than 0.2%, settling rate was by 5 times more than without adding tall oil soap and by 10% less than when polyacrylamide was used. Using as multi-component surfactant mixture tall oil soap provides the best clarifying (part of clarified acid was by 35% more than in case of polyacrylamide).

Clarified acid was delivered to the second stage of evaporation and 70.4% $P_2O_5$ polyphosphoric was obtained. Boiling temperature was 185° C., content of fluorine was 0.08% polyphosphoric acid containing effective amount of said mixture was used for receiving liquid fertilizer. Obtained NP (10:34) liquid fertilizer had excellent properties: conversion degree was 69%, freezing point was minus 50° C.

Plant growing test was carried out as in Example 2 using above liquid fertilizer and regular liquid fertilizer. Soil probes were taken from each vessel during the test in typical phases of growth (shoot appearance, tube formation, etc.) and mobile nutrients content were determined in them. The content of mobile phosphate in a soil using produced fertilizer was 20–40% more in initial phase and in final phase of wheat growth when regular fertilizer was used. The content of ammonia and nitrate in a soil increased by 20–60%. The results of plant growing tests show that using supposed multi-component mixture in fertilizer considerably increase fertilizer efficiency. It promotes also entrance of nitrogen and potassium in the plant. Developed fertilizers improve mobility of phosphorus, nitrate and ammonia in soils. This is very important for nutrition of plants.

What is claimed is:

1. A process for concentrating phosphoric acid contained in aqueous mixtures, which comprises;
    evaporating water from the aqueous mixture, in the presence of a mixture of anionic surfactants.
2. Process of claim 1 wherein evaporation is carried out in multi-stages and the aqueous mixture contains from 24 to 25% $P_2O_5$ to 70 to 76% $P_2O_5$ with clarifying of acid before, or after any stage of evaporation, producing phosphoric or polyphosphoric acid.
3. Process of claim 1 wherein the mixture of surfactants is a multi-component anionic surfactant mixture.
4. The process of claim 1, wherein said surfactant mixture is a water-soluble anionic surfactant selected from the group consisting of straight-chain aliphatic and cyclic $C_6$ to $C_{24}$ monocarboxylic acids and alcohols.
5. The process of claim 4, wherein said alcohols contain 14–30 carbon atoms.
6. The process of claim 5, wherein said alcohols are straight-chain aliphatic alcohols and cyclic monohydrate alcohols.
7. The process of claim 1, wherein said surfactant mixture comprises straight-chain aliphatic and cyclic monocarboxylic $C_6$–$C_{24}$ acids, straight-chain aliphatic alcohols, and cyclic monohydrate alcohols with molecular weight about 300–450.
8. The process of claim 1, wherein said surfactant mixture comprises by weight a) about 10 to about 98% of straight-chain aliphatic and cyclic monocarboxylic acids; b) about 0.5 to about 17% of straight-chain aliphatic alcohols; and c) about 0.1 to about 37% cyclic monohydrate alcohols with molecular weight about 300–450.
9. The process of claim 1, wherein the amount of the surfactant mixture is from 0.00001 to 0.2% by weight of the aqueous mixture.
10. The process of claim 1, wherein the surfactant mixture is mixed into phosphoric acid of any grade and kept up to 42 hours, and separatingsolids.
11. The process of claim 1, wherein said surfactant mixture is tall oil soap.
12. The process of claim 1 carried out in the presence of ammonia ion.
13. The process of claim 12, wherein said ammonia ion is provided by ammonia, ammonium salt of inorganic acid and/or ammonium salt of organic acid.
14. The process of claim 13, wherein the amount of ammonia is from 0.25% to about 10% by weight of said surfactant mixture.
15. The process of claim 2 wherein the phosphoric or polyphosphoric acid is neutralized to obtain a phosphate-containing fertilizer.

* * * * *